3,271,235
LAMINATED SAFETY GLASS
Edward Lavin, Long Meadow, George E. Mont, Springfield, and Aubrey F. Price, South Hadley, Mass., assignors to Monsanto Company, St. Louis, Mo., a corporation of Delaware
No Drawing. Filed Sept. 21, 1965, Ser. No. 489,071
17 Claims. (Cl. 161—199)

This invention relates to improved laminated safety-glass. More particularly, this invention relates to laminated safety-glass having an interlayer of a plasticized polyvinyl acetal, containing a synergistic mixture of metal alkyl carboxylates which has higher resistance to penetration.

Laminated safety-glass comprises two or more glass panels bound with an interlayer of a transparent, adherent plastic. The usual plastic interlayer is a platicized polyvinyl acetal resin forced in a sheet or film with a thickness of about 0.015 inch or more. The major commercial use of these safety-glass compositions is for automobile windshields, as well as for windshields in other moving vehicles. The ever increasing number of automobiles and the faster speed of travel today coupled with the greater area of modern day windshields has accentuated the need for improved laminated safety-glass. These structures must not only help protect persons in a car from being struck by flying objects from the outside but should prevent occupants from penetrating the windshield on impact after a sudden stop. The danger of being cut by glass in the windshield can occur not only when a body strikes the windshield and penetrates it but also when the windshield is broken and glass fragments are released. The interlayer therefore benefits the structure not only by adhering to the glass particles but also has the added advantage of absorbing energy on impact thereby decreasing the possibility of skull fracture which may occur when the head strikes the windshield, while also supplying added resistance to penetration.

The interlayers in present day commercial windshields usually contain about 0.2 to 0.8% moisture. It has been reported that some increase in resistance to penetration is found if the moisture content of the plastic interlayer is considerably higher. However, the presence of increased moisture alone to improve the penetration resistance sufficiently is impractical because the clarity of the windshield is adversely affected by the formation of bubbles between the interlayer and the glass or within the interlayer. Further, the presence of excess moisture may cause delamination. Consequently, the automotive and laminating industries have not been able to take significant advantage of this method of improving resistance to penetration.

The principal object of this invention is to provide laminated safety-glass having improved safety features.

A further object of this invention is to provide a laminated safety-glass having improved resistance to penetration by impacting objects such as the human head.

A particular object of this invention is to provide improved physical properties in laminated safety-glass.

Another object of this invention is to provide methods and means to accomplish the preceding objects.

These and other objects are accomplished in a laminated safety-glass by bonding two glass panels with an interlayer of a plasticized polyvinyl acetal resin; said interlayer having a moisture content of 0.2 to 0.8% and containing sufficient metal alkyl carboxylate to produce an alkalinity titer of from 10 to 100, said metal alkyl carboxylates being a mixture of a potassium alkyl carboxylate and at least one other meal alkyl carboxylate wherein the metal portion is selected from the group consisting of Groups II–A, I–B, II–B, IV–A, VII–B and VIII of the Periodic Table and the alkyl carboxylate portion is selected from the group consisting of formate, acetate, propionate and butyrate, said mixture containing sufficient potassium alkyl carboxylate to produce alkalinity titer of at least about 5 and up to 96% of the total alkalinity titer.

The alkalinity titer in the number of milliliters of 0.01 normal hydrochloric acid required to neutralize 100 grams of the polyvinyl acetal resin. This is an arbitrary standard used to designated the alkalinity of the resin. The alkalinity titer is usually determined prior to plasticization by dissolving 7 grams of the polyvinyl acetal resin in 250 cc. of preneutralized ethyl alcohol and titrating with 0.005 normal hydrochloric acid to the endpoint using bromphenol blue indicator and calculating from the result obtained to determine the milliliters of 0.01 normal acid required for 100 grams resin.

It is customary to stabilize polyvinyl acetals for interlayers with potassium or sodium hydroxide and/or potassium or sodium acetate by adding small amounts of these materials. These are normally added during the preparation of the polyvinyl acetal. However, these materials increase the titer level without improving the penetration resistance of impact strength of the laminate except at objectionably high titer levels. Moreover, large amounts of these salts or bases tend to increase the color of the extruded plasticized resin which is undesirable in an interlayer. The presence of such alkaline materials produces the alkalinity titer in conventional polyvinyl acetal interlayers.

The following examples are given in illustration of the invention and are not intended as limitations thereof. All parts and percentages are by weight unless otherwise specified.

Examples I to XIII are set forth as controls to illustrate the poorer results obtained when the metal alkyl carboxylates are used alone and not in synergistic combination.

Example I (a) This example uses a conventional polyvinyl acetal interlayer for safety-glass. It is a polyvinyl butyral containing 18.8% vinyl alcohol by weight and having an alkalinity titer of 20. This titer is due to the presence of potassium acetate (K acetate) in the polyvinyl butyral. The resin is plasticized with 44 parts triethylene glycol di(2-ethyl butyrate) and has a moisture content of about 0.4%. The interlayer is formed into sheets 0.015 inch thick (15 gauge) and 0.030 inch thick (30 gauge). These interlayer sheets are used as controls.

Sets of ten glass laminates are individually prepared by interposing the 15 gauge interlayer between two 24 x 36 x 0.125 inch panels of glass and the 30 gauge interlayer between two 12 x 12 x 0.125 inch panels of glass. The resulting laminates are then subjected to a temperature of about 275° F. at a pressure of 185 p.s.i. for approximately 10 minutes to bond the laminate or panels together.

Further sets of glass laminates are similarly prepared as above using plasticized polyvinyl butyral containing potassium acetate at varying levels producing the following alkalinity titers:

(b) 29
(c) 42
(d) 56

The laminates prepared by the above procedure are then subjected to mean break height tests according to the recently established tentative specifications set up by the Society of Automotive Engineers, the Subcommittee on Automotive Glazing and the results tabulated in Table I.

In essence, the mean break height test comprises placing the laminate in a horizontal position with a frame or edge support and while maintaining a constant laminate temperature, which is 70° F. in this series, allowing a 22 pound spherical ball (referred to as a head form) to drop from a designated height against approximately the middle of the laminate made with the 15 gauge interlayer. This test is repeated at increasing ball-drop heights to determine the approximate height in feet at which 50% of the laminates tested will resist penetration. In other words, the means break height of a laminate is a measure of the ability of that laminate to absorb the energy of an impacting object. The same test is used with the laminates made with 30 gauge interlayer except that a 5 pound steel ball is used on the smaller laminate.

Results of the mean break height test for the laminates of Example I are tabulated in Table I. Unless otherwise specified, the values for mean break heights in the discussion refer to those for laminates using 30 gauge interlayers.

TABLE I

[Example I(a)-I(d)]

| Example | Alkalinity Titer cc. | Mean Break Height (feet) | | Percent Moisture Content |
|---|---|---|---|---|
| | | 15 Gauge* | 30 Gauge* | |
| K Acetate: | | | | |
| I (a) | 20 | 2.3 | 7.0 | 0.40 |
| (b) | 29 | 2.4 | 7.2 | 0.40 |
| (c) | 42 | 2.9 | 8.5 | 0.43 |
| (d) | 56 | 5.8 | 16.0 | 0.48 |

*Thickness of interlayer.

Examples II–XIII are set forth as controls to illustrate the impact strength of glass laminates prepared from polyvinyl butyral interlayers wherein the titer is due to metal alkyl carboxylates wherein the metal is other than an alkali metal. These examples along with those using the synergistic mixtures of metal alkyl carboxylates or salts as they are commonly referred are prepared and tested according to the procedure of Example I. The data on Examples II–XIII are tabulated in Table II.

TABLE II

[Examples II–XIII]

| Example | Salt | Alkalinity Titer, cc. | Mean Break Height (Feet) | | Percent H₂O |
|---|---|---|---|---|---|
| | | | 15 Gauge | 30 Gauge | |
| II | Cd Acetate | 12 | 2.8 | 12.1 | 0.51 |
| III | do | 25 | 4.1 | 14.8 | 0.49 |
| IV | Zn Acetate | 7 | 2.6 | 11.3 | 0.50 |
| V | do | 21 | 5.1 | 15.8 | 0.47 |
| VI | Pb Acetate | 9 | 2.6 | 11.1 | 0.58 |
| VII | do | 20 | 3.6 | 13.9 | 0.48 |
| VIII | Ca Acetate | 20 | 2.3 | 10.0 | 0.52 |
| IX | do | 40 | 3.2 | 13.1 | 0.53 |
| X | Al Acetate | 3 | 2.2 | 10.1 | 0.58 |
| XI | do | 15 | 2.7 | 11.6 | 0.56 |
| XII | {Mg Acetate 11 titer, Zn Acetate 9 titer} | 20 | 2.5 | 10.6 | 0.35 |
| XIII | Cu Acetate | 5 | 2.4 | 10.2 | 0.53 |

In the control samples good results are obtained using potassium acetate alone only at titers of about 56. The metal alkyl carboxylates using metals other than alkali metals show mean break heights that are significantly better than those obtained with potassium acetate at those titers listed. However, it will be demonstrated below that surprisingly better impact strengths are achieved quite unexpectedly when using synergistic mixtures of potassium alkyl carboxylate with at least one other metal alkyl carboxylate wherein the metal portion is cadmium, calcium, copper, magnesium, lead or zinc.

Examples XIV–XX are set forth to show the remarkable increase in impact strength that is possible when using the synergistic mixtures of metal alkyl carboxylates in the practice of this invention. The test results on these laminates are tabulated in Table III.

TABLE III

[Examples XIV–XX]

| Example | K Acetate Titer, cc. | Salt Added | Added Salt Titer | Total Titer, cc. | Mean Break Height (Feet) | | Percent H₂O |
|---|---|---|---|---|---|---|---|
| | | | | | 15 gauge | 30 guage | |
| XIV | 21 | Cd Acetate | 9 | 30 | 7.3 | 18.0 | 0.48 |
| XV | 21 | Ca Acetate | 26 | 47 | 2.9 | 12.4 | 0.48 |
| XVI | 21 | Cu Acetate | 1 | 22 | 3.2 | 13.1 | 0.69 |
| XVII | 21 | Mg Acetate | 23 | 44 | 4.9 | 15.9 | 0.69 |
| XVIII | 21 | Pb Acetate | 6 | 27 | 7.5 | 17.8 | 0.39 |
| XIX | 21 | Zn Acetate | 5 | 26 | 4.1 | 14.8 | 0.28 |
| XX | 4 | Zn Acetate | 8 | 12 | 3.9 | 13.7 | 0.61 |

Examples XIV–XX illustrate the synergistic effect that has been discovered to result when potassium alkyl carboxylate is mixed with other metal alkyl carboxylates wherein the metal is one other than an alkali metal. This surprising result allows one to prepare a laminate with penetration resistance which surpasses the good penetration resistance of those laminates listed in Table II which did not use the synergistic mixtures. Even more surprising is the fact that the superior impact resistance of the synergistic mixtures is achieved at titer levels lower than those where the salts comprising the synergistic mixtures are used alone. Excellent results are achieved even at titer levels as low as 12 as is illustrated in Example XX.

This synergistic effect becomes readily apparent when one contrasts the alkalinity titer and mean break height of Examples I–XIII with those of XIV–XX.

A comparison of Examples I(a) and II with Example XIV will demonstrate the synergistic effect of a mixture of potassium acetate and cadmium acetate. Example XIV has a mean break height of 18.0 feet which is achieved at an alkalinity titer of 30 (21 cc. of which is due to potassium acetate and 9 cc. due to cadmium acetate). This surpasses the mean break height of Example I(a) where a potassium acetate titer of 20 only resulted in a mean break height of 7.0 feet. Example XIV also surpasses Examples I and III where titers of 12 and 25 resulted in mean break heights of 12.1 feet and 14.8 feet respectively. Thus, Example XIV uses almost one third the amount of cadmium acetate as does Example III, yet Example XIV has a higher impact resistance because of the synergistic mixture of metal alkyl carboxylates.

The superior impact resistance of laminates wherein the interlayer contains a synergistic mixture of potassium acetate and lead acetate is illustrated by comparing Example XVIII with Examples I(a) and VI–VII.

Example XVIII, contains the synergistic mixture while Example I(a) contains only potassium acetate at a titer of 20 and Examples VI–VII contain only lead acetate at titers of 9 and 20 respectively.

Example XVIII has a titer of 21 cc. due to potassium acetate and 6 cc. due to lead acetate for a total titer of 27. This results in a mean break height of 17.8 feet which is significantly higher than the mean break heights for Examples I(a), VI and VII which do not contain synergistic mixtures.

Examples XV–XVII and XIX–XX also demonstrate this improved impact resistance due to the synergistic mixtures of metal alkyl carboxylates. Example XVI further illustrates that the metal acetate titer used in combination with potassium acetate titer may be present in an amount as low as about 4% of the total salt titer.

The use of lead acetate alone, at titers around 20, results in a hazy laminate. Surprisingly enough, when lead acetate is used at titers of 20 or above in synergistic combination with potassium acetate, the clarity of the laminate improves as does its impact strength.

The following example is included to demonstrate that while certain metal acetates are more efficient than potassium acetate alone in increasing impact strength, these metal acetates do not exhibit a synergistic effect with potassium acetate.

*Example XXI*

A set of laminates is made and tested according to the procedure outlined in Example I. These laminates have an aluminum acetate titer of 4 and a potassium acetate titer of 21 for a total of 25. A mean break height of 8.0 feet is achieved at a moisture content of 0.46. This shows little or no improvement over the control samples.

Equally poor results are obtained using a potassium acetate-chromium acetate combination.

The salts used in combination with potassium alkyl carboxylates in the practice of this invention are metal alkyl carboxylates wherein the metal portion is selected from Groups II–A, I–B, II–B, IV–A, VII–B and VIII of the Periodic Table as set forth at pages 56–57 in Lange's Handbook of Chemistry, 9th Edition. Especially preferred for use as the metal portion are magnesium, calcium, copper, zinc, cadmium, lead, cobalt and nickel. The prefered alkyl carboxylates are formate, acetate, propionate and butyrate with acetate being especially preferred. Preferred are the metal acetates used in combination with potassium acetate at a total titer level of 10 to 60.

It has been found that the titer contribution of the respective salts, e.g., potassium alkyl carboxylate and other metal alkyl carboxylates wherein the metal portion is other than an alkali metal, is critical and must be maintained within certain limits if the synergistic effect at low titer levels is to be achieved. The metal acetate should contribute at least a titer of 5 and up to 96% of the total alkalinity titer.

The laminated safety-glass of this invention is especially efficient in that the improved resistance to penetration is balanced over a wide temperature range. The impact tests shown in the examples are conducted at room temperature, however, tests conducted at as low as 4° F. and as high as 120° F. indicate that these laminates exhibit improved properties over a wide temperature range.

It is well known that an increase in the thickness of the plasticized polyvinyl butyral interlayer will give some improvement to the penetration resistance of the laminates. This invention is equally applicable to the thicker laminates. In fact the use of an 0.030 inch interlayer containing these synergistic mixtures of metal alkyl carboxylates results in mean break heights more than double those of the 0.015 inch interlayers of the examples. One of the prime goals of the safety councils for safer motor vehicles is to prevent windshield penetration by any part of the human body upon collision at today's rates of speed. As a result of this invention, windshield laminates can be prepared which from test results indicate that the laminates would not be penetrated on collision impacts even where the automobile was travelling at speeds in excess of 25 m.p.h. In other words, at normal interlayer moisture contents, if the alkalinity level is controlled in accordance with the practice of this invention, a far superior safety laminate will result.

As earlier noted, the moisture content of the polyvinyl butyral interlayer cannot be increased too greatly if bubble problems are to be avoided. In addition, the moisture content of the interlayer is rather difficult to control since it can be affected by atmospheric conditions and the particular laminating process. Consequently, it is critical that the moisture content be maintained rather low, i.e., 0.2 to 0.8%. On the other hand, the alkalinity titer of the polyvinyl butyral interlayer can be readily increased by the addition of these synergistic mixtures of salts during the preparation of the polyvinyl butyral resin. The minimum quantity of synergistic mixtures of metal alkyl carboxylates necessary to effect a particular improvement in penetration resistance of the final laminate has been found to be inversely proportional in some degree to the prefered moisture content, i.e., greater impact strength is achieved at the upper end of the 0.2 to 0.8% moisture range. The amount of moisture is generally kept within the range of 0.2 to 0.8% with the interlayers of this invention.

Table IV illustrates the small effect of moisture within the normal moisture range in the absence of any salts on the impact strength of various sets of glass laminates. The plasticized interlayer sheets having an alkalinity titer of zero are prepared from a resin thoroughly washed after swelling in alcohol-water as described below.

TABLE IV.—EFFECT OF MOISTURE ON MEAN BREAK HEIGHT

| Alkalinity Titer | Percent Moisture Content | Mean Break Height (Feet) | |
|---|---|---|---|
| | | 15 gauge Interlayer | 30 gauge Interlayer |
| 0 | .06 | 2.3 | 7.5 |
| 0 | .31 | 2.4 | 7.7 |
| 0 | .37 | 2.4 | 7.8 |
| 0 | .50 | 2.8 | 8.0 |
| 0 | .75 | 3.0 | 8.3 |

Taken alone the presence of from 0.1 to 0.8% water in the interlayer has little effect on the mean break height. However, this effect is increased in the presence of the synergistic mixtures of metal alkyl carboxylates of this invention. The result is that laminates containing the synergistic mixtures of salts and having a moisture content in the upper end of the 0.2 to 0.8% range would have somewhat better impact resistance than those in the lower end of the moisture range.

In order to avoid alkali burns on processing of the resin during plasticization or extrusion and to avoid excessive sensitivity to moisture in the interlayers which may result in edge separation of the laminates it is highly preferred to limit the alkalinity titer so that it is not over 100. For the above reasons, it is a preferred embodiment of this invention to limit the alkalinity titer to a maximum of 100 within the range of 0.2 to 0.8% moisture content. The lower limit of effectiveness of the alkalinity titer for improved impact strength is about 10. Within a moisture content of 0.2 to 0.8%, a most preferred range of alkalinity titer is 10 to 60, with a range of 10 to 45 being especially preferred.

In general, the laminates are prepared by interposing the plasticized polyvinyl butyral interlayer between a pair of glass plates and then subjecting the resulting assembly to a temperature of 190 to 325° F. and a pressure of 150 to 225 p.s.i. for at least 10 minutes to bond the assembly together.

The polyvinyl acetal resins which are employed in the present invention may be made from various unsubstituted ketones containing an active carbonyl group or from mixtures of unsubstituted aldehydes and ketones. Thus, formaldehyde, acetaldehyde, propionaldehyde, butyraldehyde, valeraldehyde, hexaldehyde, benzaldehyde, crotonaldehyde, cyclohexanone and the like and mixtures thereof may be utilized. In general, the acetal resin is made by reacting an aldehyde with hydrolyzed polyvinyl ester wherein the carboxylic moiety is derived from an aliphatic acid of from 1 to 8 carbon atoms such as formate, acetate, propionate, butyrate, 2-ethylhexylate, etc. in the presence of a solvent for the product and precipitating the resin product with water. Alternate methods might include carrying out the reaction in the presence of a non-solvent dispersing medium such as water or a non-solvent mixture of water and solvent, e.g., a water-ethanol mixture. More detailed methods for preparing such resins are set forth in Morrison et al. U.S. Patent No. Re. 20,430, dated June 29, 1937, and Lavin et al U.S. Patent No. 2,496,480. In general, polyvinyl acetal resins made from saturated lower unsubstituted aliphatic aldehydes are the most suitable. These would include polyvinyl acetal resins made from unsubstituted saturated aliphatic aldehydes containing less than 6 carbon atoms such as propionaldehyde, valeraldehyde and especially those made from formaldehyde, acetaldehyde, butyraldehyde and mixtures thereof. Particularly preferred are polyvinyl acetal resins made from butyraldehyde.

In general the polyvinyl acetal resins employed have Staudinger molecular weights ranging from about 50,000 to 600,000 and preferably from 150,000 to 270,000 and may be considered to be made up, on a weight basis, of from 5 to 25% hydroxyl groups, calculated as polyvinyl alcohol, 0 to 40% ester, and preferably acetate groups, calculated as polyvinyl ester, e.g., acetate, and the balance substantially acetal. When the acetal is butyraldehyde acetal, the polyvinyl acetal resin will preferably contain, on a weight basis, from 9 to 30% hydroxyl groups, calculated as polyvinyl alcohol and from 0 to 3% ester, e.g., acetate, groups calculated as polyvinyl ester, the balance being substantially butyraldehyde acetal.

The resin prepared according to the above methods will contain approximately 10–40 cc. alkalinity titer which is generally composed of potassium alkyl carboxylate or sodium alkyl carboxylate depending on the process used. In order to replace these salts with the salts of this invention, the resin is swelled in a mixture of alcohol-water (0.960 sp. gr.) at about 40° C. for about 1 hour and then washed thoroughly with water until the dried resin is neutral to brom-phenol blue in the alkalinity titer test. Appropriate amounts of the salts of this invention are then added to a slurry of the washed zero alkalinity titer resin (5 parts water per part of resin). After thirty minutes the grains are filtered and dried. Uniform distribution of the salts is further effected by the plasticization step. However, it is readily apparent that when one uses the synergistic mixtures of this invention it may not be necessary to wash any or all of the potassium alkyl carboxylates out of the resin. In instances where the proper amount of potassium alkyl carboxylate is already present in the resin, as a result of the stabilization procedure, one would simply add the desired amount of the other metal alkyl carboxylate such as cadmium acetate, calcium acetate, copper acetate, magnesium acetate, lead acetate and zinc acetate.

An alternative method of adding the salts to a zero titer resin is by adding it with the plasticizer during the plasticization step.

The resin produced may be plasticized to the extent of about 20 to 80 parts plasticizer per 100 parts resin and more commonly between 40 and 50 parts for normal windshield use. This latter concentration is generally used with polyvinyl butyrals containing 18 to 23% vinyl alcohol by weight. In general, the plasticizers which are commonly employed are esters of a polybasic acid or a polyhydric alcohol. Particularly suitable are triethylene glycol di(2-ethyl butyrate), dibutyl sebacate, and di(betabutoxyethyl)adipate. The resulting plasticized resin mixture is then generally extruded in the form of sheets and cut to size to produce the interlayers used in the present invention. The plasticized polyvinyl butyral resin interlayer is self-adhesive in nature thereby eliminating the need for a separate adhesive to bond the glass laminate together.

Safety-glass laminates find special application in the automotive and aircraft industries for protecting passengers both against the hazards of flying objects and to reduce injury caused by bodily impact against the laminate. Wherever else glass or transparent panels are utilized such as in the building trade, the protection afforded by safety-glass has become increasingly important. The laminates of the present invention increase the advantages of utilizing safety-glass because of their improved safety performance.

It is obvious that many variations may be made in the products and processes set forth above without departing from the spirit and scope of this invention.

What is claimed is.

1. An improved interlayer for laminated safety-glass comprising a polyvinyl acetal resin; said interlayer having a moisture content of 0.2 to 0.8% and containing sufficient metal alkyl carboxylate to produce an alkalinity titer of from 10 to 100, said metal alkyl carboxylate being a mixture of potassium alkyl carboxylate and at least one other metal alkyl carboxylate wherein the metal portion is selected from the group consisting of Groups II–A, I–B, II–B, IV–A, VII–B and VIII of the Periodic Table, and the alkyl carboxylate portion is selected from the group consisting of formate, acetate, propionate and butyrate, said mixture containing sufficient potassium alkyl carboxylate to produce an alkalinity titer of at least about 5 and up to 96% of the total alkalinity titer.

2. An improved interlayer as in claim 1 wherein the polyvinyl acetal is polyvinyl butyral.

3. An improved interlayer as in claim 2 wherein the polyvinyl butyral has a vinyl alcohol content of from 9 to 30% by weight and is plasticized with from 20 to 50 parts plasticizer per 100 parts polyvinyl butyral.

4. An interlayer as in claim 2 wherein potassium acetate is used in combination with zinc acetate.

5. An interlayer as in claim 2 wherein potassium acetate is used in combination with cadmium acetate.

6. An interlayer as in claim 2 wherein potassium acetate is used in combination with lead acetate.

7. An interlayer as in claim 2 wherein potassium acetate is used in combination with copper acetate.

8. An interlayer as in claim 2 wherein potassium acetate is used in combination with a mixture of zinc acetate and lead acetate.

9. An improved laminated safety-glass comprising two layers of glass bonded to a plasticized polyvinyl acetal interlayer; said interlayer having a moisture content of 0.2 to 0.8% and containing sufficient metal alkyl carboxylate to produce an alkalinity titer of 10 to 100, said metal alkyl carboxylate being a mixture of potassium alkyl carboxylate and at least one other metal alkyl carboxylate wherein the metal portion is selected from the group consisting of Groups II–A, I–B, II–B, IV–A, VII–B and VIII of the Periodic Table, and the alkyl carboxylate portion is selected from the group consisting of formate, acetate, propionate and butyrate, said mixture containing sufficient potassium alkyl carboxylate to produce an alkalinity titer of at least about 5 and up to 96% of the total alkalinity titer.

10. An improved laminated safety-glass as in claim 9 wherein the polyvinyl acetal is polyvinyl butyral.

11. An improved laminated safety-glass as in claim 9 wherein the polyvinyl butyral has a vinyl alcohol content of from 9 to 30% by weight and is plasticized with from 20 to 50 parts plasticizer per 100 parts polyvinyl butyral.

12. An improved laminated safety-glass as in claim 9 wherein potassium acetate is used in combination with zinc acetate.

13. An improved laminated safety-glass as in claim 9 wherein potassium acetate is used in combination with cadmium acetate.

14. An improved laminated safety-glass as in claim 9 wherein potassium acetate is used in combination with lead acetate.

15. An improved laminated safety-glass as in claim 9 wherein potassium acetate is used in combination with copper acetate.

16. An improved laminated safety-glass as in claim 9 wherein potassium acetate is used in combination with a mixture of zinc acetate and lead acetate.

17. The method of preparing an improved plasticized polyvinyl acetal interlayer which comprises mixing an aqueous slurry of a polyvinyl acetal resin containing sufficient metal alkyl carboxylate to produce a total alkalinity titer in the resin of 10 to 100, said metal alkyl carboxylate being a mixture of potassium alkyl carboxylate and at least one other metal alkyl carboxylate wherein the metal portion is selected from the group consisting of Groups II–A, I–B, II–B, IV–A, VII–B and VIII of the Periodic Table, and the alkyl carboxylate portion is selected from the group consisting of formates, acetate, propionates and butyrates, said resin containing sufficient potassium alkyl carboxylate to produce a titer of at least about 5 and up to about 96% of the total titer, filtering the resin and adjusting the moisture content of the resin to 0.2 to 0.8% by weight, plasticizing the resin, and forming the interlayer.

References Cited by the Examiner

UNITED STATES PATENTS

| 2,456,462 | 12/1948 | Stamatoff | 260—73 |
| 2,496,480 | 2/1950 | Lavin et al. | 260—73 |
| 2,946,711 | 7/1960 | Bragaw et al. | 161—199 |
| 3,231,461 | 1/1966 | Mattimoe | 161—199 |

FOREIGN PATENTS

| 136,704 | 3/1950 | Australia. |

ALEXANDER WYMAN, *Primary Examiner.*

W. J. VAN BALEN, *Assistant Examiner.*